(12) United States Patent
Gitzen et al.

(10) Patent No.: US 11,840,178 B2
(45) Date of Patent: Dec. 12, 2023

(54) FIFTH WHEEL COUPLING WITH A CAMERA

(71) Applicant: JOST-WERKE DEUTSCHLAND GMBH, Neu-Isenburg (DE)

(72) Inventors: Stephan Gitzen, Riedstadt (DE); Mark Müller, Frankfurt (DE); Swen Saupe, Mainz (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 17/785,606

(22) PCT Filed: Dec. 2, 2020

(86) PCT No.: PCT/IB2020/061375
§ 371 (c)(1),
(2) Date: Jun. 15, 2022

(87) PCT Pub. No.: WO2021/123991
PCT Pub. Date: Jun. 24, 2021

(65) Prior Publication Data
US 2023/0026584 A1 Jan. 26, 2023

(30) Foreign Application Priority Data
Dec. 20, 2019 (DE) .......................... 102019008919.7

(51) Int. Cl.
*B60R 11/04* (2006.01)
*B62D 53/08* (2006.01)
*B60R 11/00* (2006.01)

(52) U.S. Cl.
CPC .......... *B60R 11/04* (2013.01); *B62D 53/0807* (2013.01); *B60R 2011/004* (2013.01); *B60R 2300/808* (2013.01)

(58) Field of Classification Search
CPC ............... B60R 11/04; B60R 2011/004; B60R 2300/808; B62D 53/0807
See application file for complete search history.

(56) References Cited

U.S. PATENT DOCUMENTS

| 9,357,114 B1 | 5/2016 | Whitehead | |
| 9,637,052 B2* | 5/2017 | Whitehead | B60R 1/00 |
| 2014/0151979 A1* | 6/2014 | Puckett | B60D 1/62 |
| | | | 280/477 |
| 2022/0212668 A1* | 7/2022 | Joseph | B60Q 1/50 |

FOREIGN PATENT DOCUMENTS

| DE | 102004029130 A1 | 12/2005 |
| DE | 102004048139 A1 | 4/2006 |

* cited by examiner

*Primary Examiner* — Kevin Hurley
*Assistant Examiner* — Marlon A Arce
(74) *Attorney, Agent, or Firm* — Hudak, Shunk & Farine Co. LPA

(57) ABSTRACT

A fifth wheel coupling with a camera, including a coupling plate and a bearing element, with which the coupling plate can be secured to a towing vehicle, wherein the coupling plate has a centrally arranged locking region for receiving a king pin, as well as an insertion opening running along a longitudinal axis (x) and bordered on both sides by two insertion flanges. The camera is mounted in a position in the region of the fifth wheel coupling with the lowest possible risk of soiling and damage, with the camera being secured to the bearing element.

20 Claims, 2 Drawing Sheets

FIFTH WHEEL COUPLING WITH A CAMERA

FIELD OF THE INVENTION

The invention relates to a fifth wheel coupling with a camera comprising a coupling plate and a bearing element, with which the coupling plate can be secured to a towing vehicle, wherein the coupling plate has a centrally arranged locking region for receiving a king pin, as well as an insertion opening running along a longitudinal axis (x) and bordered on both sides by two insertion flanges.

BACKGROUND OF THE INVENTION

The fifth wheel coupling is usually arranged on a towing vehicle and is used to mechanically connect a trailer to the towing vehicle by means of a king pin attached thereto. For this purpose, the fifth wheel coupling has a coupling plate which is supported on the towing vehicle via bearing elements and a locking mechanism for locking the king pin which is usually provided on the underside of the coupling plate. During coupling, the towing vehicle approaches the stationary semi-trailer backwards, so that the king pin enters an insertion opening of the fifth wheel coupling and is guided from there until it reaches its end position in a locking region.

With the help of a camera attached to the towing vehicle, the approach of the towing vehicle to the trailer should be simplified or even automated for the driver. For this purpose, US 2014/0151979 A1 proposes mounting the camera on a crossbar which is arranged between the bars of the towing vehicle specifically for the camera and which is arranged in the longitudinal direction of the vehicle between the fifth wheel coupling and the rear of the towing vehicle. As a result, the camera can be aligned in the middle of the vehicle's longitudinal axis and should thereby enable the towing vehicle to approach the trailer exactly. However, it has turned out to be disadvantageous that the camera is located behind the wheels of the towing vehicle and is particularly exposed to dirt that is thrown up, which leads to a significant optical impairment of the camera. Furthermore, a position of the camera at the rear end of the towing vehicle means that the camera can easily be hit and destroyed by the king pin when the air suspension is extended during coupling. Since the rear-facing camera is run over by the king pin very early and the camera no longer detects the close-up detection of the king pin when it enters the insertion opening of the coupling plate, a second, forward-facing camera is required, which makes the entire system relatively expensive.

Document DE 10 2004 029 130 A1 establishes another state of the art with a camera that is to be arranged under or in the fifth wheel coupling in order to be able to detect the king pin much more easily due to the central position of the camera than if the camera were on one side of the fifth wheel coupling. However, a camera position located in the longitudinal axis of the vehicle has the disadvantageous consequence that the camera is always located in the area of influence of the king pin and is therefore exposed to an increased risk of damage. In addition, the locking region located in the center of the coupling plate is always supplied with lubricating grease, which constantly gets onto the camera and also causes optical impairments there.

SUMMARY OF THE INVENTION

The object of the invention therefore was to mount the camera in a position in the region of the fifth wheel coupling with the lowest possible risk of soiling and damage.

A fifth wheel coupling with a camera, comprising a coupling plate and a bearing element, with which the coupling plate can be secured to a towing vehicle, wherein the coupling plate has a centrally arranged locking region for receiving a king pin, as well as an insertion opening running along a longitudinal axis (x) and bordered on both sides by two insertion flanges wherein the camera is secured to the bearing element. Accordingly, the camera is not connected to the coupling plate, but to a bearing element or component that is directly or indirectly connected to the coupling plate. The bearing element is typically arranged in the force flow between the coupling plate and the towing vehicle or its vehicle frame.

At least a section of the camera or a holder connected to the camera is provided at least partially in an area between the coupling plate and the vehicle frame or protrudes into this area, which is typically unobstructed due to the pivoting movements of the coupling plate around a pivot axis running in the transverse direction occurring during driving. In addition, freight forwarders and manufacturers of towing vehicles require the lowest possible overall height of the entire fifth wheel coupling system in order to be able to realize the maximum possible loading height on the part of the trailer. Due to the low overall height of the fifth wheel coupling, the space available under the coupling plate is reduced to a minimum.

In the course of the development of smaller cameras with sufficiently high image resolution, attachment of the camera to a bearing element of the coupling plate offers a particularly secure installation position for the camera in an area covered by the coupling plate.

By attaching the camera to a bearing element of the fifth wheel coupling, it is in close proximity to the end position of the king pin that has been inserted into the coupling, so that the king pin can be seen by the camera during coupling for as long as possible and the phase is relatively short in which a kingpin cannot be seen by the camera.

Advantageously, the camera is arranged offset laterally to the longitudinal axis of the coupling plate and is therefore outside the area of influence of a king pin during coupling or uncoupling of a semi-trailer. An installation position in the transverse direction outside the insertion opening is particularly favorable.

According to a first preferred embodiment, the bearing element is formed from two bearing blocks arranged on both sides of the locking region and the camera is fastened to one of the bearing blocks. The coupling plate is supported on the towing vehicle by means of the bearing blocks. The bearing blocks are regularly fixed in place on the towing vehicle and enable the coupling plate to move relative to a pivot axis running in the transverse direction. A significant advantage of attaching the camera to the bearing blocks is that they do not perform any pivoting movement and are regularly also fixed in the longitudinal axis of the coupling plate. The camera is therefore attached in a fixed position relative to the towing vehicle and can also be calibrated particularly precisely. Due to the fact that it is attached eccentrically with respect to the longitudinal axis, the image of the camera is not covered by parts of the trailer, in particular the king pin, when a trailer is approaching.

The camera is sensibly carried by a bearing block holder supported by one of the bearing blocks. As a result, a vision cone emanating from the camera is even less covered by components of the fifth wheel coupling.

The camera can preferably be attached to the bearing block using the bearing block holder in such a way that the top side of the camera has a height difference to the top side of the coupling plate located next to it in the transverse direction, which is greater than the protrusion of the king pin with respect to the trailer plate surrounding it. This ensures that a king pin passing the side of the coupling plate always passes over the camera and does not damage it. The protrusion of the king pin is usually 84 mm. The difference in height between the top of the coupling plate and the camera should therefore be greater than 84 mm.

The bearing block holder can have at least one first section aligned transversely to the longitudinal axis. With the help of this first section, the position of the camera relative to the coupling plate is relocated to the outside. With the help of a second section of the bearing block holder, which is aligned parallel to the longitudinal axis of the coupling plate, the position of the camera can also be shifted to the rear, in the direction of the free ends of the insertion flanges. Due to the angled design of the bearing block holder, neither the camera nor the bearing block holder is in the pivoting range of the coupling plate and the camera can have an almost unobstructed field of vision to the rear.

The bearing block holder is favorably designed in such a way that the camera is always arranged outside of a downwardly projected surface of the coupling plate. This results in the advantage that the camera is not optically covered by the coupling plate or is physically captured by the coupling plate by a pivoting movement while driving.

According to a second preferred embodiment, the bearing element is a bearing block traverse connecting the two bearing blocks. The bearing block traverse is a separate profile carrier that is arranged between the bearing blocks and firmly connected to them. The presence of a bearing block traverse braces the bearing blocks against one another and enables the fifth wheel coupling to be attached to a towing vehicle without a mounting plate, so that the bearing blocks can be attached to the vehicle frame either directly or by means of an auxiliary frame. Consequently, in this embodiment too, the camera can be arranged in a stationary manner in relation to the towing vehicle and can be calibrated particularly well. The bearing block traverse is basically fixed to the towing vehicle and/or fixed to the bearing blocks. It has proven to be particularly advantageous if the bearing block traverse acts on a bearing block at opposite end sections.

The camera is expediently arranged on the bearing block traverse between the bearing blocks. A position laterally offset in the transverse direction relative to the locking region is particularly preferred. This results in the advantage that a king pin moving into or out of the coupling plate is far enough away from the camera to avoid a collision, and when driving, hardly any lubricating grease from the locking mechanism installed in the locking region of the coupling plate gets onto the camera.

The camera can be carried, for example, by a bearing block traverse holder that engages the bearing block traverse. Advantageously, the bearing block traverse holder is arranged on a side facing the insertion opening on the bearing block traverse. This makes it possible to attach the camera with respect to the coupling plate in the direction of the free ends of the insertion flanges. This is advantageous in that the bearing block traverse runs under the locking region and this area is spatially particularly filled due to the closure mechanism also being located there. If the coupling plate were to tilt backwards, there would be an increased risk of colliding with components of the locking mechanism and being damaged as a result if the camera were attached directly to the bearing block traverse.

According to a third preferred embodiment, the bearing element is a bearing bridge with which the coupling plate is held on a bearing block. The bearing bridge is located in the immediate vicinity of the respective bearing block and thus in a region of the pivot axis running through the bearing blocks. Due to the large spatial distance between the camera and the insertion opening, the locking region and the free ends of the insertion flanges, this is an extremely safe mounting position for the camera. In addition, the camera can be inspected particularly well and repaired if necessary, even when the trailer is coupled.

Conveniently, the bearing bridge is passed through the bearing block in the transverse direction and is screwed to the underside of the coupling plate. The bearing bridge usually has a U-shape, with the two free ends being fixed to the coupling plate and an angled section between the free ends being guided through an opening in the bearing block.

The camera is sensibly carried by a bearing bridge holder engaging the bearing bridge. The bearing bridge holder is firmly connected to the bearing bridge, in particular by a screw connection. The bearing bridge holder is used to space the camera even further from the coupling plate, which means that a particularly wide-ranging field of view of the camera can be implemented without being covered by the coupling plate. In addition, there are further advantages with regard to the accessibility of the camera for maintenance and repair purposes.

The bearing bridge holder can be formed with a first section running in the transverse direction and with a second section running in the longitudinal axis. The position of the camera to the side of the coupling plate can be determined with the aid of the first section of the bearing bridge holder running in the transverse direction, and the position of the camera in the direction of the free ends of the insertion flanges can be determined with the aid of the second section of the bearing bridge holder running in the longitudinal direction.

According to a fourth preferred embodiment, the bearing element is a mounting plate. The mounting plate is usually placed on the vehicle frame from above and connected to the vehicle frame in a non-positive manner. The bearing blocks are usually positioned with their underside on the mounting plate. The power flow runs from the coupling plate, via the bearing blocks and the mounting plate to the vehicle frame. The mounting plate allows a particularly wide range of options for the position of the camera due to its surface-like extent. Another advantage is that the closed surface of the mounting plate prevents components on the towing vehicle such as lines or cables placed by the manufacturer from migrating into the vision cone of the camera and impairing the image visible from the camera.

Advantageously, the camera is attached to a top side of the mounting plate. This results in the advantage that the camera can longer capture a king pin that is always approaching from above its position due to a lack of overlap, in particular due to the closed mounting plate itself, during the coupling. In addition, when the camera is attached to the top of the mounting plate, it does not protrude into the space between the beams of the vehicle frame, which vehicle manufacturers like to keep free for the installation and installation of components on the towing vehicle.

The camera can be arranged particularly favorably under one of the insertion flanges. In this position, the camera is housed particularly safely, since the trailer has a largely standardized front contour, from which no components can get into the vertical area between the insertion flanges and the mounting plate during the coupling process. On the other hand, the vision cone of the camera extends into the free insertion opening, so that a king pin driving into the coupling plate is captured for a sufficient length of time.

BRIEF DESCRIPTION OF THE DRAWINGS

For better understanding, the invention is explained in more detail below with reference to four figures showing in FIG. 1: a perspective view of a fifth wheel coupling according to a first embodiment with a camera attached to a bearing block.

DETAILED DESCRIPTION OF THE INVENTION

Figure 1:
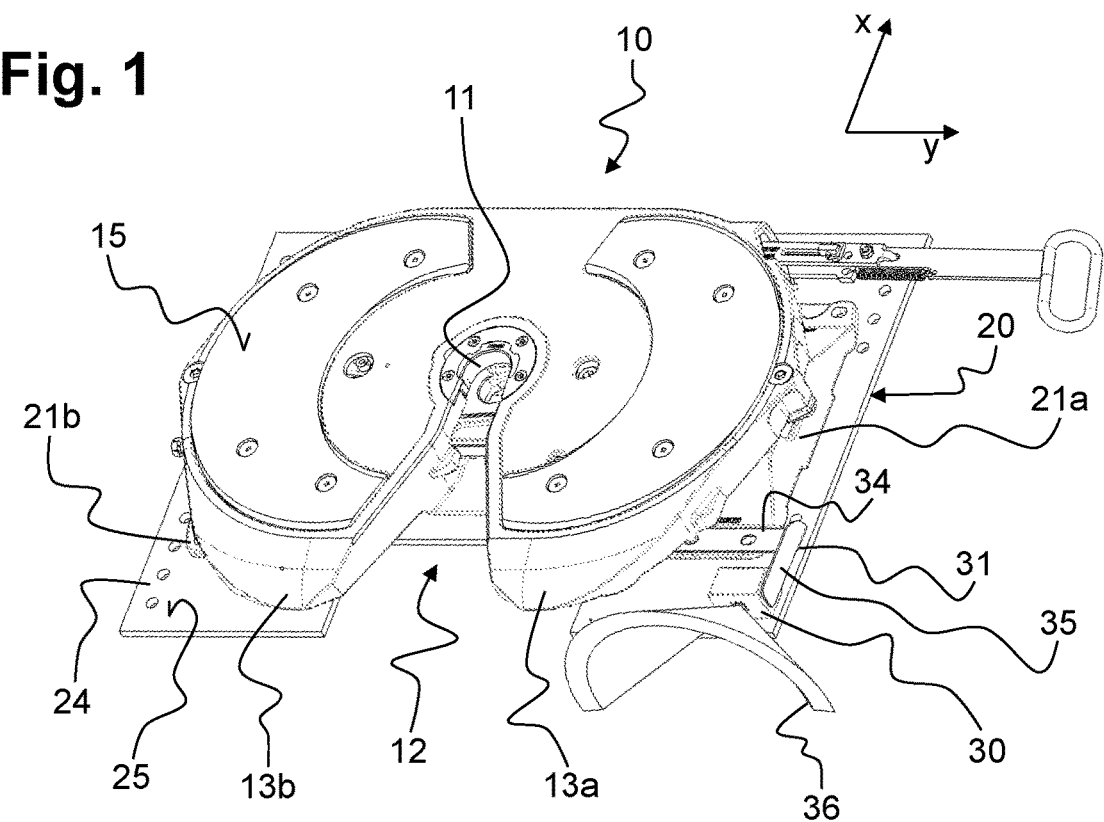

FIG. 1 shows a perspective view of a fifth wheel having a coupling plate 10 and a bearing element 20, with which the coupling plate 10 is attached to a towing vehicle, not shown.

The coupling plate 10 serves to connect the towing vehicle to a trailer whose king pin is rotatably held in a locking region 11 of the coupling plate 10 when the vehicle is being driven. When the trailer is being coupled or uncoupled, the king pin enters and exits the locking region 11 via an insertion opening 12 formed radially in the coupling plate 10. The insertion opening 12 is widened conically at its end remote from the locking region 11 for lateral guidance of the king pin and is limited in the transverse direction y of the coupling plate 10 by two insertion flanges 13*a*, 13*b*.

The bearing element 20 of the fifth wheel coupling comprises two bearing blocks 21*a*, 21*b* and a mounting plate 24. The bearing blocks 21*a*, 21*b* are arranged on both sides of the locking region 11 of the coupling plate 10 in the transverse direction y and are connected to the coupling plate 10 in such a way that it is pivotably mounted about the transverse direction y. The underside of both bearing blocks 21*a*, 21*b* rests on the mounting plate 24, which in the mounted position is placed on a vehicle frame of the towing vehicle. The bearing element 10 is always arranged in a rotationally fixed manner relative to the towing vehicle.

According to the first embodiment of the invention shown in FIG. 1, a camera 30 is fixed to the bearing block 21*a*. For this purpose, a bearing block holder 31, which is connected to the camera 30 at its free end, detachably engages on the bearing block 21*a*. The bearing block holder 31 is thus always arranged in a fixed position in relation to the bearing block 21*a* and the towing vehicle.

The bearing block holder 31 has a first section 34, which extends in the transverse direction y and protrudes laterally beyond the outside of the bearing block 21*a* and the outer contour of the coupling plate 10, and a second section 35, which extends in the longitudinal direction x of the coupling plate 10 on the opposite side of the bearing block 21*a*. The camera 30 and the bearing block holder 31 are thus arranged outside the pivoting range of the coupling plate 10 and cannot be captured by the latter when the vehicle is being driven or when it is being coupled. In addition, the camera 30 is positioned in relation to the coupling plate 10 in such a way that a vision cone 36 of the camera 30 is not covered by the adjacent insertion flange 13*a*, regardless of the tilting angle of the coupling plate 10.

Figure 2:
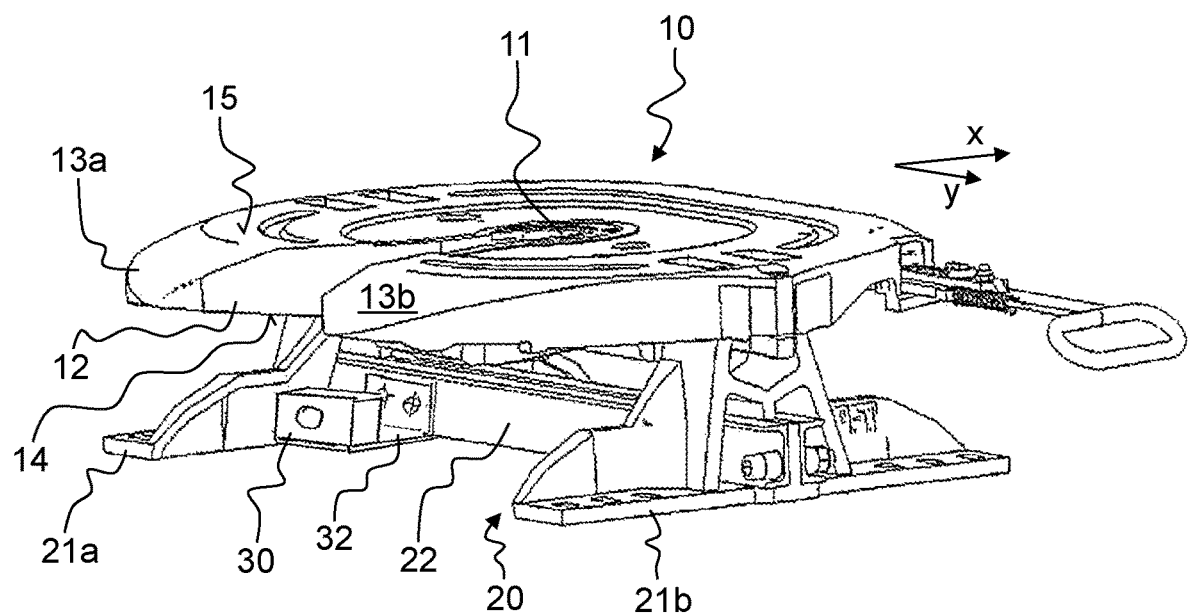
FIG. 2: a perspective view of a fifth wheel coupling according to a second embodiment with a camera attached to a bearing block traverse.

A second embodiment of the invention is shown in FIG. 2. The bearing block traverse 22 is firmly connected at its ends to the bearing blocks 21*a*, 21*b* and stiffens the fifth wheel coupling to such an extent that no mounting plate 24 needs to be installed. The bearing block traverse 22 is aligned in the transverse direction y and runs under the locking region 11 of the coupling plate 10. Like the bearing blocks 21*a*, 21*b*, the bearing block traverse 22 is also arranged in a stationary manner in relation to the towing vehicle.

The camera 30 is attached to the bearing block traverse 22 by means of a bearing block traverse holder 32. The camera 30 is laterally offset in the transverse direction y to the insertion opening 12 and thus preferably under one of the insertion flanges 13*a*. This ensures that the camera 30 is not caught and destroyed by the coupling plate 10 or the king pin even if the coupling plate 10 is misaligned.

The underside of the bearing blocks 21*a*, 21*b* and/or the underside of the bearing block traverse 22 form a level that does not reach below the level of the vehicle frame when the fifth wheel coupling is installed, since the manufacturers typically use this space for their own units and reinforcements of the vehicle frame. The camera 30 is also held by the bearing block traverse holder 32 in such a way that neither the bearing block traverse holder 32 nor the camera 30 is lowered below the level of the bearing blocks 21*a*, 21*b* and/or the bearing block traverse 22.

Figure 3:
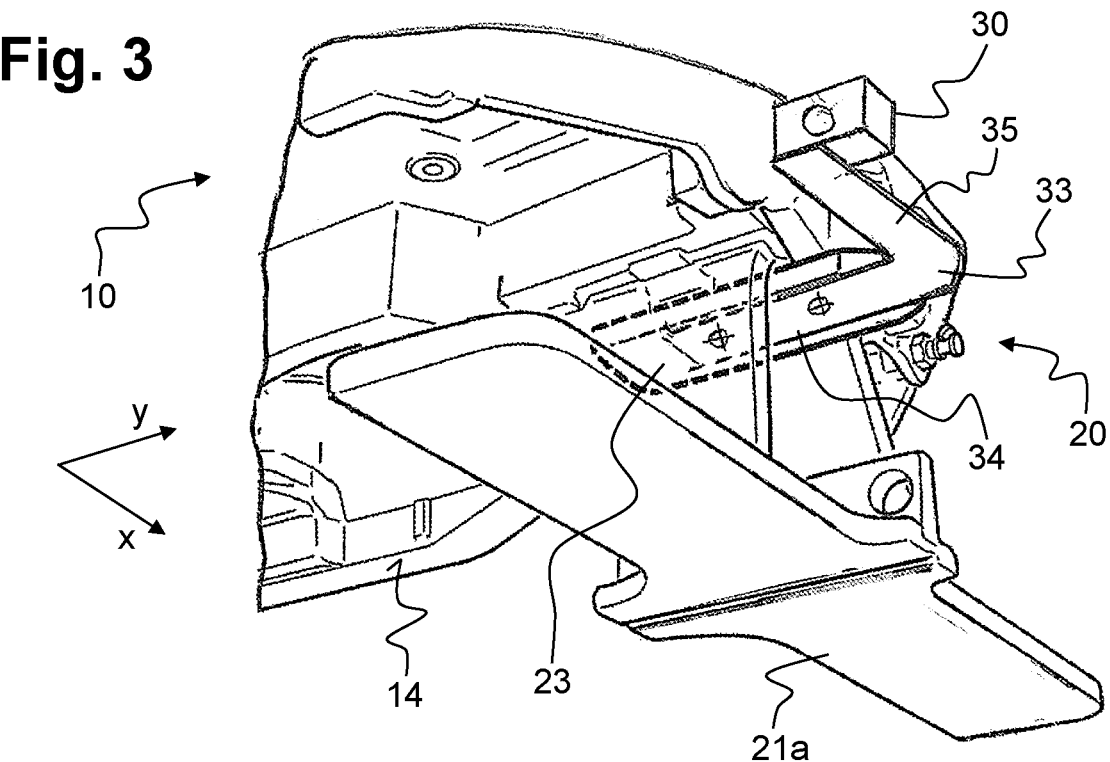
FIG. 3: a perspective bottom view of a section of a fifth wheel coupling according to a third embodiment with a camera attached to a bearing bridge

FIG. 3 shows a third embodiment of the invention, in which the camera 30 is fastened to a bearing element 20 in the form of a bearing bridge 23. The bearing bridge 23 is passed through the bearing block 21*a* and is connected to the coupling plate 10 on both sides of the bearing block 21*a*. Typically, the bearing bridge 23 has a U-shape, with the two free ends being screwed to the coupling plate 10 and the middle section, which is offset by 90° thereto, rests in an opening in the bearing block 21*a*. The bearing bridge 23 prevents the coupling plate 10 from being lifted off the respective bearing block 21*a*, 21*b*.

The camera 30 is carried by a bearing bridge holder 33 which is screwed to the bearing bridge 23 in a detachable manner. The bearing bridge holder 33 is fastened to the bearing bridge 23 at a first section 34 of the bearing bridge holder 33, which is aligned in the transverse direction y of the coupling plate 10 and holds the camera 30 laterally to the outer contour of the coupling plate 10. A second section 35 of the bearing bridge holder 33 runs parallel to the longitudinal axis x of the coupling plate 10, as a result of which the camera 30 is held next to the adjacent insertion flange 13*a* on the side facing away from the insertion opening 12. The camera 30 is always arranged below a level of a top side 15 of the coupling plate 10 or the insertion flanges 13*a*, 13*b*. Due to the positioning of the camera 30 next to the coupling plate 10, this is in a protected area outside of the insertion flanges 13*a*, 13*b* with respect to the king pin.

Figure 4:
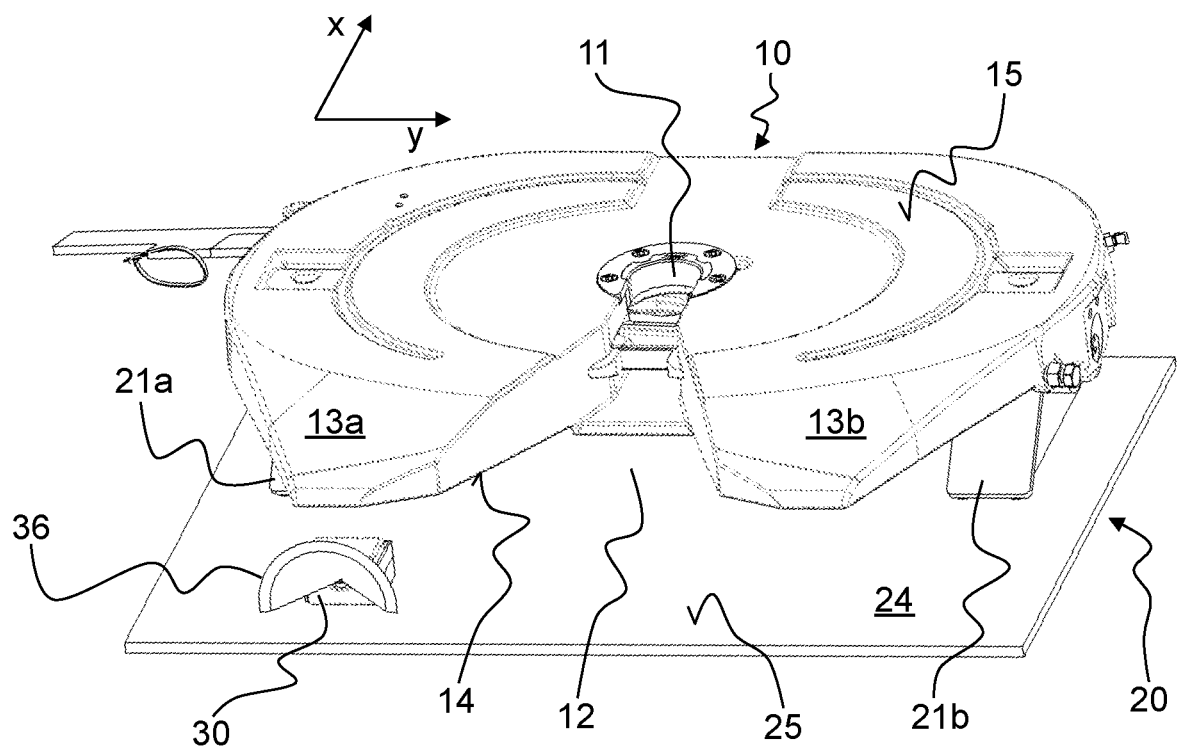
FIG. 4: a perspective view of a fifth wheel coupling according to a fourth embodiment with a camera attached to a mounting plate.

FIG. 4 illustrates a fourth embodiment in a perspective view, in which the camera 30 is attached to a bearing element 20 in the form of a mounting plate 24. In order to keep the space within the vehicle frame free, the camera 30 is attached to a top side 25 of the mounting plate 24. In the installed position, the camera 30 is arranged at a vertical distance from an underside 14 of the coupling plate 10, in particular from its insertion flanges 13*a*, 13*b*.

The camera 30 is arranged under one of the insertion flanges 13*a* and is thus protected in the longitudinal axis x of the coupling plate 10 from an approaching semi-trailer, which would always collide with the insertion flanges 13a, 13b instead of the camera 30 even if the coupling were incorrect. A king pin of the trailer that is misaligned in the transverse direction y would be held in the insertion opening 12 by the insertion flanges 13a, 13b or would scrape on the outer sides of the insertion flanges 13a, 13b, but would not contact the camera 30.

LIST OF REFERENCE NUMERALS 10 coupling plate
11 locking region
12 insertion opening
13a,b insertion flanges
14 underside of coupling plate
15 top side coupling plate
20 bearing element
21a,b bearing blocks
22 bearing block traverse
23 bearing bridge
24 mounting plate
25 top side mounting plate
30 camera
31 bearing block holder
32 bearing block traverse holder
33 bearing bridge holder
34 first section
35 second section
36 vision cone camera
x longitudinal axis coupling plate
y transverse direction coupling plate

What is claimed is:

1. A fifth wheel coupling with a camera, comprising:
a coupling plate and a bearing element, with which the coupling plate is secured to a towing vehicle,
wherein the coupling plate has a centrally arranged locking region for receiving a king pin, as well as an insertion opening running along a longitudinal axis (x) and bordered on both sides by two insertion flanges,
wherein the camera is secured to the bearing element, and
wherein the bearing element is arranged in a force flow between the coupling plate and a vehicle frame of the towing vehicle.

2. The fifth wheel coupling according to claim 1, wherein the camera is arranged offset laterally to the longitudinal axis (x).

3. The fifth wheel coupling according to claim 1, wherein the bearing element is formed from two bearing blocks arranged on both sides of the locking region and the camera is fastened to one of the bearing blocks.

4. The fifth wheel coupling according to claim 3, wherein the camera is carried by a bearing block holder supported by one of the bearing blocks.

5. The fifth wheel coupling according to claim 4, wherein the bearing block holder has at least one first section aligned transversely to the longitudinal axis (x).

6. The fifth wheel coupling according to claim 4, wherein the bearing block holder is designed such that the camera is always arranged outside a downwardly projected surface of the coupling plate.

7. The fifth wheel coupling according to claim 1, wherein the bearing element is a bearing block traverse connecting two bearing blocks.

8. The fifth wheel coupling according to claim 7, wherein the camera is arranged on the bearing block traverse between the bearing blocks.

9. The fifth wheel coupling according to claim 7, wherein the camera is carded by a bearing blocks traverse holder engaging the bearing blocks traverse.

10. A fifth wheel coupling with a camera, comprising:
a coupling plate and a bearing element, with which the coupling plate is secured to a towing vehicle,
wherein the coupling plate has a centrally arranged locking region for receiving a king pin, as well as an insertion opening running along a longitudinal axis (x) and bordered on both sides by two insertion flanges,
wherein the camera is secured to the bearing element, and
wherein the bearing element is a bearing bridge with which the coupling plate is held on a bearing block.

11. The fifth wheel coupling according to claim 10, wherein the camera is carried by a bearing bridge holder engaging the bearing bridge.

12. The fifth wheel according to claim 1, wherein the bearing element is a mounting plate.

13. The fifth wheel coupling according to claim 12, wherein the camera is arranged under one of the insertion flanges.

14. The fifth wheel coupling according to claim 2, wherein the bearing element is formed from two bearing blocks arranged on both sides of the locking region and the camera is fastened to one of the bearing blocks, and wherein the camera is carried by a bearing block holder supported by one of the bearing blocks.

15. The fifth wheel coupling according to claim 14, wherein the bearing block holder has at least one first section aligned transversely to the longitudinal axis (x), and wherein the bearing block holder is designed such that the camera is always arranged outside a downwardly projected surface of the coupling plate.

16. The fifth wheel coupling according to claim 2, wherein the bearing element is a bearing block traverse connecting two bearing blocks, wherein the camera is arranged on the bearing block traverse between the bearing blocks, and wherein the camera is carried by a bearing blocks traverse holder engaging the bearing blocks traverse.

17. The fifth wheel coupling according to claim 2, wherein the bearing element is a bearing bridge with which the coupling plate is held on a bearing block, wherein the bearing bridge is passed through the bearing block in the transverse direction (y) and is screwed to the underside of the coupling plate, and wherein the camera is carried by a bearing bridge holder engaging the bearing bridge.

18. The fifth wheel according to claim 2, wherein the bearing element is a mounting plate, wherein the camera is attached to a top side of the mounting plate, and wherein the camera is arranged under one of the insertion flanges.

19. The fifth wheel coupling according to claim 10, wherein the bearing bridge is passed through the bearing block in the transverse direction (y) and is screwed to the underside of the coupling plate.

20. A fifth wheel coupling with a camera, comprising:
a coupling plate and a bearing element, with which the coupling plate is secured to a towing vehicle,
wherein the coupling plate has a centrally arranged locking region for receiving a king pin, as well as an insertion opening running along a longitudinal axis (x) and bordered on both sides by two insertion flanges,
wherein the camera is secured to the bearing element,
wherein the bearing element is a mounting plate, and
wherein the camera is attached to a top side of the mounting plate.

* * * * *